(12) United States Patent
Takahashi

(10) Patent No.: US 12,524,878 B2
(45) Date of Patent: *Jan. 13, 2026

(54) RADIATION IMAGE PROCESSING DEVICE, RADIATION IMAGE PROCESSING METHOD, AND RADIATION IMAGE PROCESSING PROGRAM

(71) Applicant: FUJIFILM Corporation, Tokyo (JP)

(72) Inventor: Tomoyuki Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 286 days.

This patent is subject to a terminal disclaimer.

(21) Appl. No.: 18/452,505

(22) Filed: Aug. 18, 2023

(65) Prior Publication Data

US 2024/0104729 A1   Mar. 28, 2024

(30) Foreign Application Priority Data

Sep. 22, 2022   (JP) ................................ 2022-151983

(51) Int. Cl.
*G06T 7/00* (2017.01)
*G06T 5/50* (2006.01)
(Continued)

(52) U.S. Cl.
CPC .............. *G06T 7/0012* (2013.01); *G06T 5/50* (2013.01); *G06T 7/11* (2017.01); *G06T 7/60* (2013.01); *G06T 2207/30008* (2013.01)

(58) Field of Classification Search
CPC .......... G06T 7/0012; G06T 5/50; G06T 7/11; G06T 7/60; G06T 2207/30008;
(Continued)

(56) References Cited

U.S. PATENT DOCUMENTS

| 2008/0232668 A1* | 9/2008 | Kitamura ................. G06T 7/11 382/132 |
| 2009/0087070 A1* | 4/2009 | Slabaugh ................. G06T 5/20 382/132 |

(Continued)

FOREIGN PATENT DOCUMENTS

| JP | 2021-058363 A | 4/2021 |
| JP | 2022-056084 A | 4/2022 |

(Continued)

*Primary Examiner* — Van D Huynh
(74) *Attorney, Agent, or Firm* — Studebaker Brackett PLLC

(57) ABSTRACT

A processor acquires a first radiation image and a second radiation image which are acquired by imaging a subject, which includes a first component consisting of a plurality of compositions and a second component consisting of a single composition, with radiation having different energy distributions, derives a characteristic of the first component related to attenuation of the radiation based on the first and second radiation images in a first component region including only the first component in the first or second radiation image, derives the characteristic of the first component in a second component region including the second component in the first or second radiation image based on the characteristic of the first component derived in the first component region around the second component region, and derives a first component image and a second component image in which the first component and the second component are emphasized, respectively, based on the characteristic of the first component in at least a region of the subject in the first or second radiation image.

16 Claims, 10 Drawing Sheets

(51) Int. Cl.
 *G06T 7/11* (2017.01)
 *G06T 7/60* (2017.01)
(58) Field of Classification Search
 CPC ........... G06T 2207/10116; G06T 2207/10152; A61B 6/482; A61B 6/505; A61B 6/5217
 See application file for complete search history.

(56) References Cited

U.S. PATENT DOCUMENTS

| | | | | |
|---|---|---|---|---|
| 2009/0116722 | A1* | 5/2009 | Chen | G06T 11/008 378/98.9 |
| 2013/0022170 | A1* | 1/2013 | Cho | A61B 6/482 378/62 |
| 2013/0053689 | A1* | 2/2013 | Das | A61B 6/03 600/425 |
| 2014/0219423 | A1* | 8/2014 | Bertens | A61B 6/032 378/62 |
| 2021/0100520 | A1 | 4/2021 | Kawamura | |
| 2021/0118193 | A1* | 4/2021 | Torii | G01T 1/161 |
| 2021/0401393 | A1* | 12/2021 | Kawanishi | A61B 6/4488 |
| 2022/0172365 | A1 | 6/2022 | Kawamura | |
| 2022/0240882 | A1* | 8/2022 | Noda | A61B 6/4266 |
| 2023/0153970 | A1 | 5/2023 | Iwashita et al. | |

FOREIGN PATENT DOCUMENTS

| | | |
|---|---|---|
| JP | 2022-097760 A | 6/2022 |
| WO | 2021/054090 A1 | 3/2021 |

* cited by examiner

RADIATION IMAGE PROCESSING DEVICE, RADIATION IMAGE PROCESSING METHOD, AND RADIATION IMAGE PROCESSING PROGRAM

CROSS REFERENCE TO RELATED APPLICATIONS

The present application claims priority from Japanese Patent Application No. 2022-151983, filed on Sep. 22, 2022, the entire disclosure of which is incorporated herein by reference.

BACKGROUND

Technical Field

The present disclosure relates to a radiation image processing device, a radiation image processing method, and a radiation image processing program.

Related Art

In the related art, energy subtraction processing using two radiation images obtained by irradiating a subject with two types of radiation having different energy distributions by using the fact that an attenuation amount of the transmitted radiation differs depending on the substance constituting the subject has been known (for example, see WO2021/054090A and JP2022-097760A). The energy subtraction processing is a method in which respective pixels of the two radiation images obtained as described above are associated with each other, and subtraction is performed after multiplying a weight coefficient based on an attenuation coefficient according to a composition between pixels to acquire an image in which specific compositions, such as a bone part and a soft part, included in the radiation image are separated. Further, a method of separating a soft tissue of the subject into fat and muscle by energy subtraction processing has also been proposed (see JP2021-058363A and JP2022-056084A).

In order to separate the bone part and the soft part of the subject by the energy subtraction processing, the attenuation coefficient of the soft part is necessary. Here, in a region in which only the soft part is included in the radiation image, the attenuation coefficient of the soft part can be directly obtained from the radiation image. However, since the soft part and the bone part overlap each other in the bone region in the radiation image, the attenuation coefficient of the soft part cannot be directly obtained from the radiation image. In addition, the soft part does not consist of a single composition, but a plurality of compositions, such as the fat and the muscle, are mixed in a complicated manner. Also, the composition of the soft part varies greatly among individuals. Therefore, it is difficult to accurately obtain the attenuation coefficient of the soft part in the bone region in which the soft part and the bone part overlap each other in the radiation image. As described above, in a case in which the attenuation coefficient of the soft part cannot be obtained accurately, in a case in which processing is performed by using a characteristic related to the attenuation of the radiation as in the energy subtraction processing, a plurality of components, such as the bone part and the soft part, cannot be separated accurately.

SUMMARY OF THE INVENTION

The present disclosure has been made in view of the above circumstances, and is to accurately separate a plurality of components included in a radiation image.

The present disclosure relates to a radiation image processing device comprising at least one processor, in which the processor acquires a first radiation image and a second radiation image which are acquired by imaging a subject, which includes a first component consisting of a plurality of compositions and a second component consisting of a single composition, with radiation having different energy distributions, derives a characteristic of the first component related to attenuation of the radiation based on the first radiation image and the second radiation image in a first component region including only the first component in the first radiation image or the second radiation image, derives the characteristic of the first component in a second component region including the second component in the first radiation image or the second radiation image based on the characteristic of the first component derived in the first component region around the second component region, and derives a first component image in which the first component is emphasized and a second component image in which the second component is emphasized, based on the characteristic of the first component in at least a region of the subject in the first radiation image or the second radiation image.

Note that, in the radiation image processing device according to the present disclosure, the processor may specify the second component region in the first radiation image or the second radiation image based on a pixel value of the first radiation image or the second radiation image, and may specify a region other than the second component region in the first radiation image or the second radiation image as the first component region.

In addition, in the radiation image processing device according to the present disclosure, the processor may derive an attenuation characteristic related to the attenuation of the radiation in at least the region of the subject in the first radiation image or the second radiation image, may specify the first component region and the second component region based on the attenuation characteristic in the region of the subject, and may use the attenuation characteristic derived for the first component region as the characteristic of the first component for the first component region.

In addition, in the radiation image processing device according to the present disclosure, the processor may derive a first attenuation image and a second attenuation image, which represent attenuation amounts of the radiation due to the subject, from the first radiation image and the second radiation image, respectively, and may derive an attenuation ratio, which is a ratio between corresponding pixels of the first attenuation image and the second attenuation image, as the characteristic of the first component.

In addition, in the radiation image processing device according to the present disclosure, the processor may derive a first attenuation image and a second attenuation image, which represent attenuation amounts of the radiation due to the subject, from the first radiation image and the second radiation image, respectively, and may derive an attenuation ratio, which is a ratio between corresponding pixels of the first attenuation image and the second attenuation image, as the attenuation characteristic.

In addition, in the radiation image processing device according to the present disclosure, the processor may derive an initial second component attenuation image in which the second component is emphasized, based on the first attenuation image, the second attenuation image, and the characteristic of the first component, may derive a second component attenuation image by matching a contrast of the second component included in the initial second component attenuation image with a contrast of the second component included in the first attenuation image or the second attenuation image, may derive a first component attenuation image in which the first component is emphasized, based on the first attenuation image or the second attenuation image, and the second component attenuation image, and may derive the first component image and the second component image from the first component attenuation image and the second component attenuation image, respectively.

In addition, in the radiation image processing device according to the present disclosure, the processor may derive information related to thicknesses of the plurality of compositions in at least the region of the subject in the first radiation image or the second radiation image, and may specify the first component region and the second component region based on the information related to the thicknesses of the plurality of compositions in the region of the subject.

In addition, in the radiation image processing device according to the present disclosure, the processor may derive an attenuation coefficient of the first component as the characteristic of the first component based on an attenuation coefficient of the radiation of each of the plurality of compositions included in the first component and information related to a thickness of each of the plurality of compositions.

In addition, in the radiation image processing device according to the present disclosure, the processor may derive a first attenuation image and a second attenuation image, which represent attenuation amounts of the radiation due to the subject, from the first radiation image and the second radiation image, respectively, may derive a thickness of the first component and a thickness of the second component based on the first attenuation image, the second attenuation image, the characteristic of the first component, and a characteristic of the second component, and may derive the first component image and the second component image based on the thickness of the first component and the thickness of the second component.

In addition, in the radiation image processing device according to the present disclosure, the first component may be a soft part of the subject, the second component may be a bone part of the subject, and the plurality of compositions included in the first component may be fat and muscle.

The present disclosure relates to a radiation image processing method comprising acquiring a first radiation image and a second radiation image which are acquired by imaging a subject, which includes a first component consisting of a plurality of compositions and a second component consisting of a single composition, with radiation having different energy distributions, deriving a characteristic of the first component related to attenuation of the radiation based on the first radiation image and the second radiation image in a first component region including only the first component in the first radiation image or the second radiation image, deriving the characteristic of the first component in a second component region including the second component in the first radiation image or the second radiation image based on the characteristic of the first component derived in the first component region around the second component region, and deriving a first component image in which the first component is emphasized and a second component image in which the second component is emphasized, based on the characteristic of the first component in at least a region of the subject in the first radiation image or the second radiation image.

The present disclosure relates to a radiation image processing program causing a computer to execute a procedure of acquiring a first radiation image and a second radiation image which are acquired by imaging a subject, which includes a first component consisting of a plurality of compositions and a second component consisting of a single composition, with radiation having different energy distributions, a procedure of deriving a characteristic of the first component related to attenuation of the radiation based on the first radiation image and the second radiation image in a first component region including only the first component in the first radiation image or the second radiation image, a procedure of deriving the characteristic of the first component in a second component region including the second component in the first radiation image or the second radiation image based on the characteristic of the first component derived in the first component region around the second component region, and a procedure of deriving a first component image in which the first component is emphasized and a second component image in which the second component is emphasized, based on the characteristic of the first component in at least a region of the subject in the first radiation image or the second radiation image.

According to the present disclosure, it is possible to accurately separate the plurality of components included in the radiation image.

DETAILED DESCRIPTION

In the following description, embodiments of the present disclosure will be described with reference to the drawings.

Figure 1:
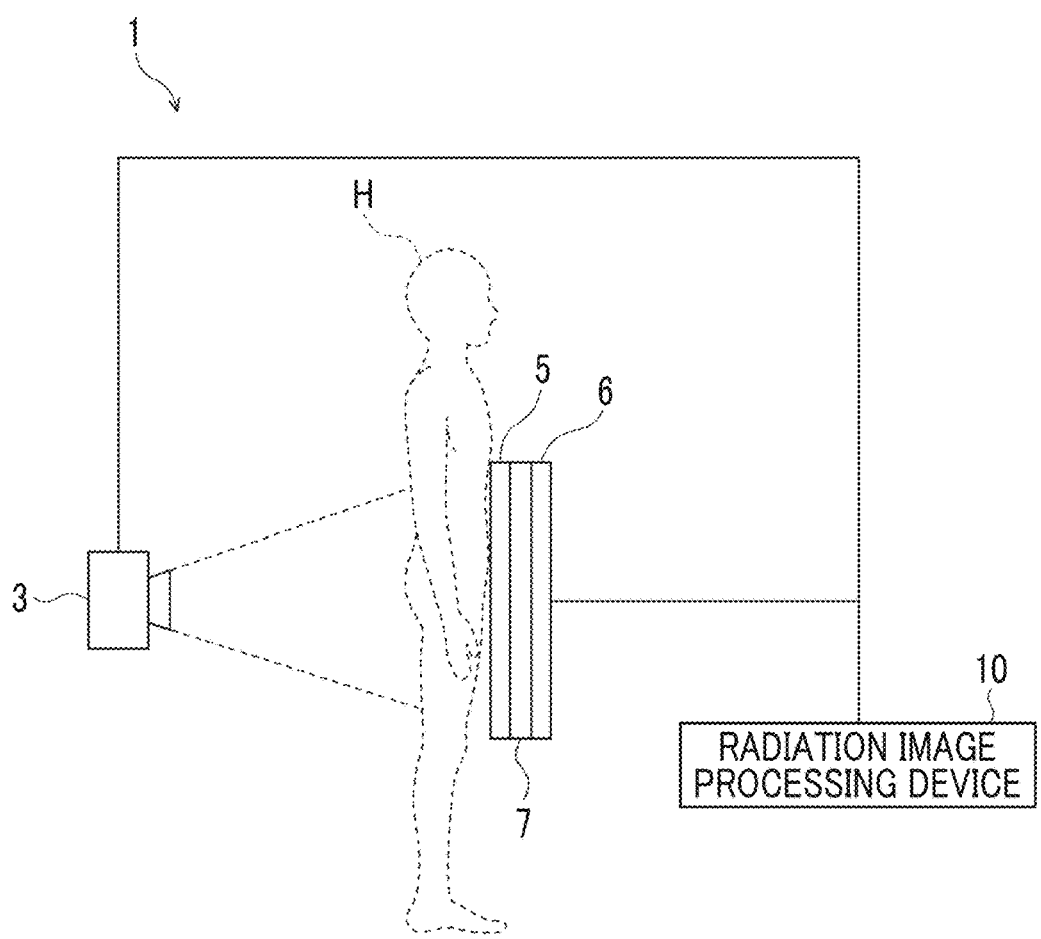
FIG. 1 is a schematic block diagram showing a configuration of a radiography system to which a radiation image processing device according to a first embodiment of the present disclosure is applied.

FIG. 1 is a schematic block diagram showing a configuration of a radiography system to which a radiation image processing device according to a first embodiment of the present disclosure is applied. As shown in FIG. 1, the radiography system according to the first embodiment comprises an imaging apparatus 1 and a radiation image processing device 10 according to the present embodiment.

The imaging apparatus 1 is an imaging apparatus for performing energy subtraction imaging by a so-called one-shot method for changing energy of each of radiation, such as X-rays, emitted from a radiation source 3 and transmitted through a subject H and irradiating a first radiation detector 5 and a second radiation detector 6 with the converted radiation. During the imaging, as shown in FIG. 1, the first radiation detector 5, a radiation energy conversion filter 7 made of a copper plate or the like, and the second radiation detector 6 are disposed in order from a side closest to the radiation source 3, and the radiation source 3 is driven. Note that the first and second radiation detectors 5 and 6 are closely attached to the radiation energy conversion filter 7.

As a result, in the first radiation detector 5, a first radiation image G1 of the subject H by low-energy radiation also including so-called soft rays is acquired. In addition, in the second radiation detector 6, a second radiation image G2 of the subject H by high-energy radiation from which the soft rays are removed is acquired. The first and second radiation images G1 and G2 are input to the radiation image processing device 10.

The first and second radiation detectors 5 and 6 can perform recording and reading-out of the radiation image repeatedly. A so-called direct-type radiation detector that directly receives emission of the radiation and generates an electric charge may be used, or a so-called indirect-type radiation detector that converts the radiation into visible light and then converts the visible light into an electric charge signal may be used. In addition, as a method for reading out a radiation image signal, it is desirable to use a so-called thin film transistor (TFT) readout method in which the radiation image signal is read out by turning a TFT switch on and off, or a so-called optical readout method in which the radiation image signal is read out by emission of read out light. However, other methods may also be used without being limited to these methods.

Figure 2:
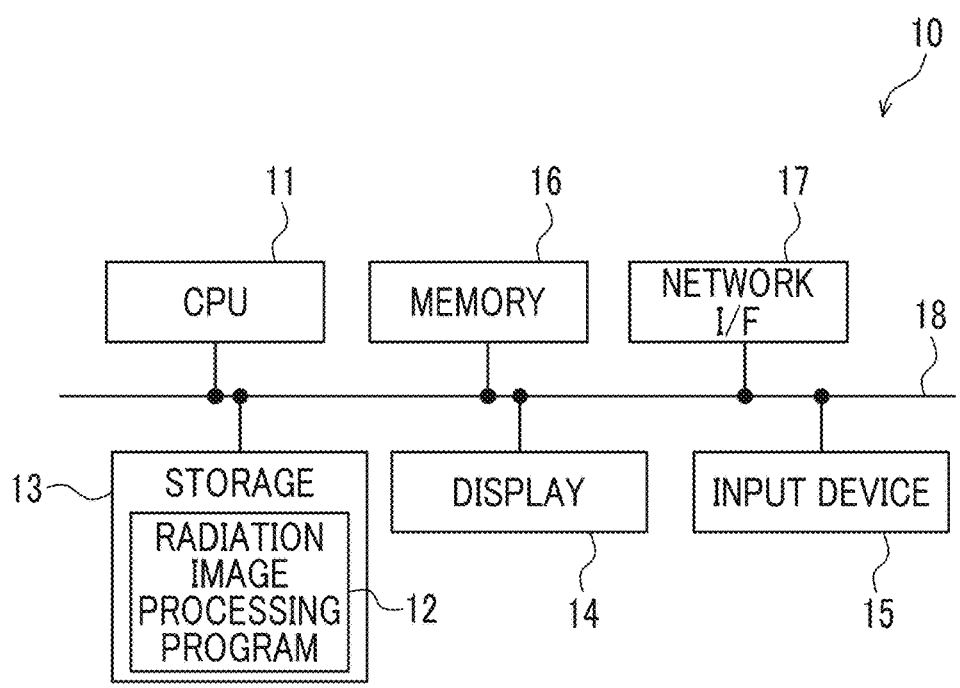
FIG. 2 is a diagram showing a schematic configuration of the radiation image processing device according to the first embodiment.

Hereinafter, the radiation image processing device according to the first embodiment will be described. First, with reference to FIG. 2, a hardware configuration of the radiation image processing device according to the first embodiment will be described. As shown in FIG. 2, the radiation image processing device 10 is a computer, such as a workstation, a server computer, and a personal computer, and comprises a central processing unit (CPU) 11, a non-volatile storage 13, and a memory 16 as a transitory storage region. In addition, the radiation image processing device 10 comprises a display 14, such as a liquid crystal display, an input device 15, such as a keyboard and a mouse, and a network interface (IN) 17 connected to a network (not shown). The CPU 11, the storage 13, the display 14, the input device 15, the memory 16, and the network OF 17 are connected to a bus 18. Note that the CPU 11 is an example of a processor according to the present disclosure.

The storage 13 is realized by a hard disk drive (HDD), a solid state drive (SSD), a flash memory, and the like. A radiation image processing program 12 installed in the radiation image processing device 10 is stored in the storage 13 as a storage medium. The CPU 11 reads out the radiation image processing program 12 from the storage 13, expands the read out radiation image processing program 12 to the memory 16, and executes the expanded radiation image processing program 12.

The radiation image processing program 12 is stored in a storage device of the server computer connected to the network or in a network storage in a state of being accessible from the outside, and is downloaded and installed in the computer that configures the radiation image processing device 10 in response to the request. Alternatively, the radiation image processing program 12 is distributed in a state of being recorded on a recording medium, such as a digital versatile disc (DVD) or a compact disc read only memory (CD-ROM), and is installed in the computer that configures the radiation image processing device 10 from the recording medium.

Figure 3:
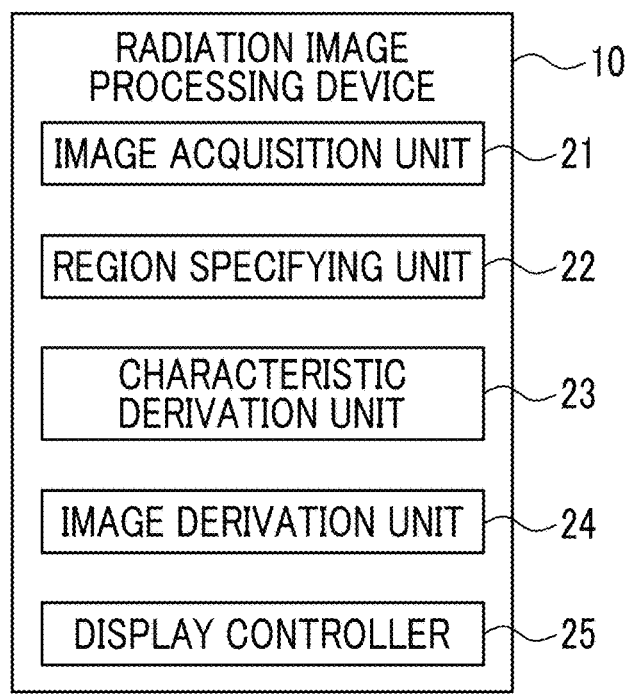
FIG. 3 is a diagram showing a functional configuration of the radiation image processing device according to the first embodiment.

Next, a functional configuration of the radiation image processing device according to the first embodiment will be described. FIG. 3 is a diagram showing the functional configuration of the radiation image processing device according to the first embodiment. As shown in FIG. 3, the radiation image processing device 10 comprises an image acquisition unit 21, a region specifying unit 22, a characteristic derivation unit 23, an image derivation unit 24, and a display controller 25. Moreover, by executing a radiation image processing program 12, the CPU 11 functions as the image acquisition unit 21, the region specifying unit 22, the characteristic derivation unit 23, the image derivation unit 24, and the display controller 25.

The image acquisition unit 21 acquires the first radiation image G1 and the second radiation image G2 of the subject H from the first and second radiation detectors 5 and 6 by causing the imaging apparatus 1 to perform the energy subtraction imaging of the subject H. In this case, imaging conditions, such as an imaging dose, an energy distribution, a tube voltage, and an SID, are set. The imaging conditions need only be set by input from the input device 15 by a user. The set imaging conditions are stored in the storage 13. Note that the first and second radiation images G1 and G2 may be acquired by a program different from the radiation image processing program according to the first embodiment. In this case, the image acquisition unit 21 reads out the first and second radiation images G1 and G2 stored in the storage 13 from the storage 13 for processing.

Figure 4:
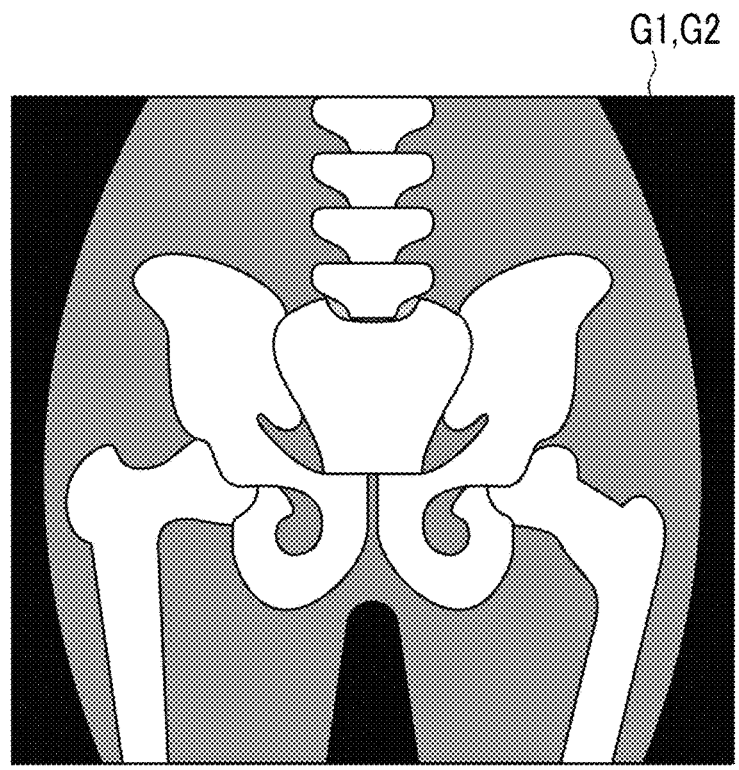
FIG. 4 is a diagram showing first and second radiation images.

FIG. 4 is a diagram showing the first and second radiation images. As shown in FIG. 4, a region of the subject H and a direct radiation region obtained by directly irradiating the radiation detectors 5 and 6 with the radiation are included in the first and second radiation images G1 and G2. A soft region and a bone region are included in the region of the subject H. A soft part component of a human body includes muscle, fat, blood, and water. In the present embodiment, a non-fat tissue including blood and water is treated as the muscle. The soft part component and a bone part component of the subject H are examples of a first component and a second component according to the present disclosure, respectively. The muscle and the fat are examples of a plurality of compositions according to the present disclosure.

The soft regions of the first and second radiation images G1 and G2 include only the soft part component of the subject H. The bone regions of the first and second radiation images G1 and G2 are actually regions in which the bone part component and the soft part component are mixed. The soft region is an example of a first component region including only the first component according to the present disclosure, and the bone region is an example of a second component region including the second component according to the present disclosure.

Figure 5:
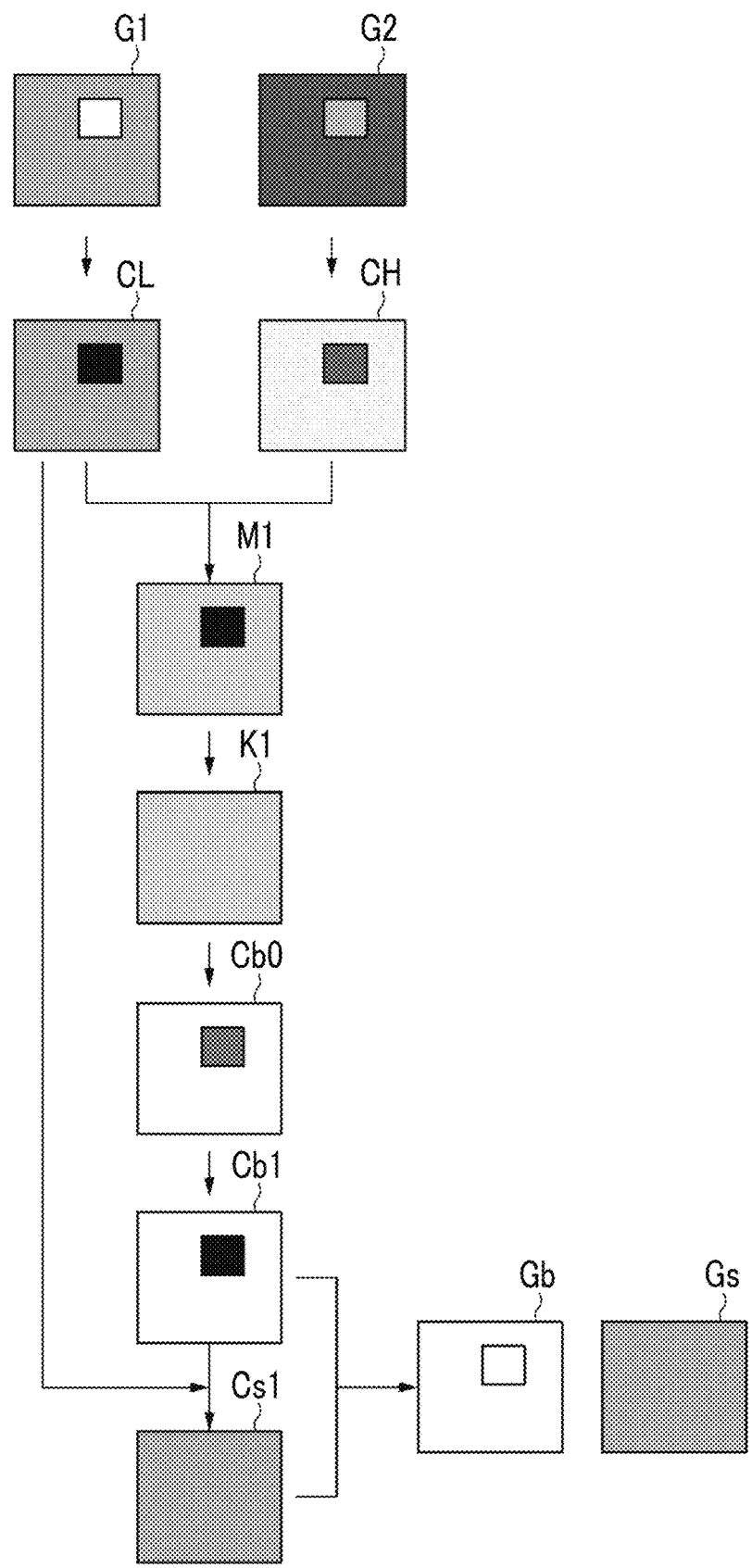
FIG. 5 is a diagram schematically showing processing performed in the radiation image processing device according to the first embodiment.

Hereinafter, the region specifying unit 22, the characteristic derivation unit 23, and the image derivation unit 24 will be described together with processing performed in the radiation image processing device according to the first embodiment. FIG. 5 is a diagram schematically showing the processing performed in the radiation image processing device according to the first embodiment. Note that, in FIG. 5, in order to simplify the description, the first radiation image G1 and the second radiation image G2 do not include the direct radiation region, and include a rectangular bone region in the soft region.

In the first embodiment, the region specifying unit 22 specifies the bone region and the soft region in the first radiation image G1 or the second radiation image G2. For this reason, the region specifying unit 22 derives an attenuation characteristic related to the attenuation of the radiation in at least the region of the subject H of the first radiation image G1 or the second radiation image G2, and specifies the soft region and the bone region based on the attenuation characteristic in the region of the subject H. In the first embodiment, the region specifying unit 22 derives a first attenuation image CL and a second attenuation image CH, which represent the attenuation amounts of the radiation due to the subject H, from the first radiation image G1 and the second radiation image G2, respectively, and derives an attenuation ratio, which is a ratio between corresponding pixels of the first attenuation image CL and the second attenuation image CH, as the attenuation characteristic.

Here, a pixel value of the first attenuation image CL represents the attenuation amount of the low-energy radiation due to the subject H, and a pixel value of the second attenuation image CH represents the attenuation amount of the high-energy radiation due to the subject H. The first attenuation image CL and the second attenuation image CH are derived from the first radiation image G1 and the second radiation image G2 by Expression (1) and Expression (2). In the expression (1), Gd1 is the pixel value of the direct radiation region in the first radiation image G1. In the expression (2), Gd2 is the pixel value of the direct radiation region in the second radiation image G2.

$$CL(x,y)=Gd1-G1(x,y) \quad (1)$$

$$CH(x,y)=Gd2-G2(x,y) \quad (2)$$

Next, the region specifying unit 22 derives an attenuation ratio map representing the attenuation ratio of the radiation between the first radiation image G1 and the second radiation image G2. Specifically, an attenuation ratio map M1 is derived by deriving a ratio between the corresponding pixels of the first attenuation image CL and the second attenuation image CH by Expression (3). The attenuation ratio is an example of a characteristic related to attenuation of the radiation according to the present disclosure.

$$M1(x,y)=CL(x,y)/CH(x,y) \quad (3)$$

Here, in the first radiation image G1 and the second radiation image G2, the attenuation ratio of the region including only the soft part component is smaller than the attenuation ratio of the region including the bone part component. Therefore, the region specifying unit 22 compares the attenuation ratios of the respective pixels of the attenuation ratio map M1, specifies a region consisting of the pixel in which the attenuation ratio is larger than a predetermined threshold value as the bone region, and specifies a region other than the bone region as the soft region. Note that the region specifying unit 22 may compare the attenuation ratio between each pixel of the attenuation ratio map M1 with the surrounding pixels, and may specify the pixel having a larger attenuation ratio than surrounding pixels as the pixel in the bone region.

The characteristic derivation unit 23 derives a characteristic of a first component related to the attenuation of the radiation based on the first radiation image G1 and the second radiation image G2 in the first component region including only the first component in the first radiation image G1 or the second radiation image G2, that is, in the soft region. In addition, the characteristic derivation unit 23 derives the characteristic of the first component in the second component region, that is, the bone region, based on the characteristic of the first component derived in the soft region around the bone region. In the present embodiment, the characteristic derivation unit 23 derives the attenuation ratio between the first radiation image G1 and the second radiation image G2 as the characteristic of the first component.

Here, in the first embodiment, the region specifying unit 22 derives the attenuation ratio, which is the characteristic related to the attenuation of the radiation, in the region of the subject H in the first radiation image G1 or the second radiation image G2. Therefore, the characteristic derivation unit 23 uses the attenuation ratio of the soft region in the attenuation ratio map M1 derived by the region specifying unit 22 as the characteristic of the first component in the soft region. That is, in the first embodiment, the region specifying unit 22 also has a function as the characteristic derivation unit 23.

On the other hand, for the bone region, the attenuation ratio of the soft region around the bone region is interpolated to derive the characteristic of the first component for the bone region, that is, the attenuation ratio. Note that, instead of the interpolation, a median value of the attenuation ratio of the soft region in the attenuation ratio map M1, an average value thereof, or a value thereof that is a predetermined ratio from the small attenuation ratio side may be derived as the attenuation ratio for the bone region.

As a result, the characteristic derivation unit 23 derives the characteristic of the first component for the region of the subject H of the first radiation image G1 or the second radiation image G2. In the first embodiment, the characteristic of the first component is the attenuation ratio of the soft region. In the first embodiment, the derived characteristic of the first component is used as a soft part removal coefficient K1 for removing the soft part in a case in which the image derivation unit 24, which will be described below, derives the bone part image.

The image derivation unit 24 derives a first component image in which the first component is emphasized and a second component image in which the second component is emphasized, based on the characteristic of the first component in a region of the subject H in the first radiation image G1 or the second radiation image G2. Specifically, the image derivation unit 24 derives a soft part image Gs in which the soft part component is emphasized and a bone part image Gb in which the bone part component is emphasized.

In the first embodiment, first, the image derivation unit 24 derives an initial second component attenuation image in which the second component is emphasized, that is, an initial bone part attenuation image in which the bone part is emphasized, based on the first attenuation image CL, the second attenuation image CH, and the soft part removal coefficient K1, which is the characteristic of the first component. Specifically, the image derivation unit 24 derives an initial bone part attenuation image Cb0 by Expression (4).

$$Cb0(x,y)=CL(x,y)-CH(x,y)\times K1(x,y) \quad (4)$$

Here, as the pixel value of the bone region of the initial bone part attenuation image Cb0 derived as described above, there are the pixel value obtained by replacing the attenuation amount of the bone part with the attenuation amount of the soft part by assuming that the soft part corresponding to the thickness of the bone part is present, and the pixel value representing a difference from an actual attenuation amount of the bone part. Therefore, a contrast is low with respect to the bone part attenuation image that is originally desired to be derived. In a case in which the bone part attenuation image having such a low contrast is used, in a case in which a soft part attenuation image is derived by subtracting the bone part attenuation image from the first attenuation image CL or the second attenuation image CH as will be described below, the bone part component cannot be removed satisfactorily.

Therefore, in the first embodiment, the image derivation unit 24 derives a bone part attenuation image Cb1 by matching a contrast of the initial bone part attenuation image Cb0 with a contrast of the first attenuation image CL or the second attenuation image CH. In the first embodiment, the contrast of the initial bone part attenuation image Cb0 is matched with the contrast of the first attenuation image CL. Therefore, the image derivation unit 24 converts the contrast of the initial bone part attenuation image Cb0 by multiplying the initial bone part attenuation image Cb0 by a contrast conversion coefficient. Then, a correlation between a difference value ΔCL derived by subtracting the initial bone part attenuation image Cb0 after the contrast conversion from the first attenuation image CL and the initial bone part attenuation image Cb0 is derived. Then, the contrast conversion coefficient is determined so that the correlation is minimized, and the determined contrast conversion coefficient is multiplied by the initial bone part attenuation image Cb0 to derive the bone part attenuation image Cb1.

Note that a table representing the contrast conversion coefficient in which the contrast of the initial bone part attenuation image Cb0 and a body thickness are associated with each other may be created in advance. In this case, the bone part attenuation image Cb1 may be derived by deriving the body thickness of the subject H by the measurement or the like, deriving the contrast conversion coefficient with reference to the table from the contrast and the body thickness of the initial bone part attenuation image Cb0, and converting the initial bone part attenuation image Cb0 by using the derived contrast conversion coefficient.

Then, the image derivation unit 24 derives a soft part attenuation image Cs1 by subtracting the bone part attenuation image Cb1 from the first attenuation image CL by Expression (5).

$$Cs1(x,y)=CL(x,y)-Cb1(x,y) \quad (5)$$

Further, the image derivation unit 24 derives the bone part image Gb and the soft part image Gs by Expression (6) and Expression (7).

$$Gb(x,y)=Gd1(x,y)-Cb1(x,y) \quad (6)$$

$$Gs(x,y)=Gd2(x,y)-Cs1(x,y) \quad (7)$$

Figure 6:
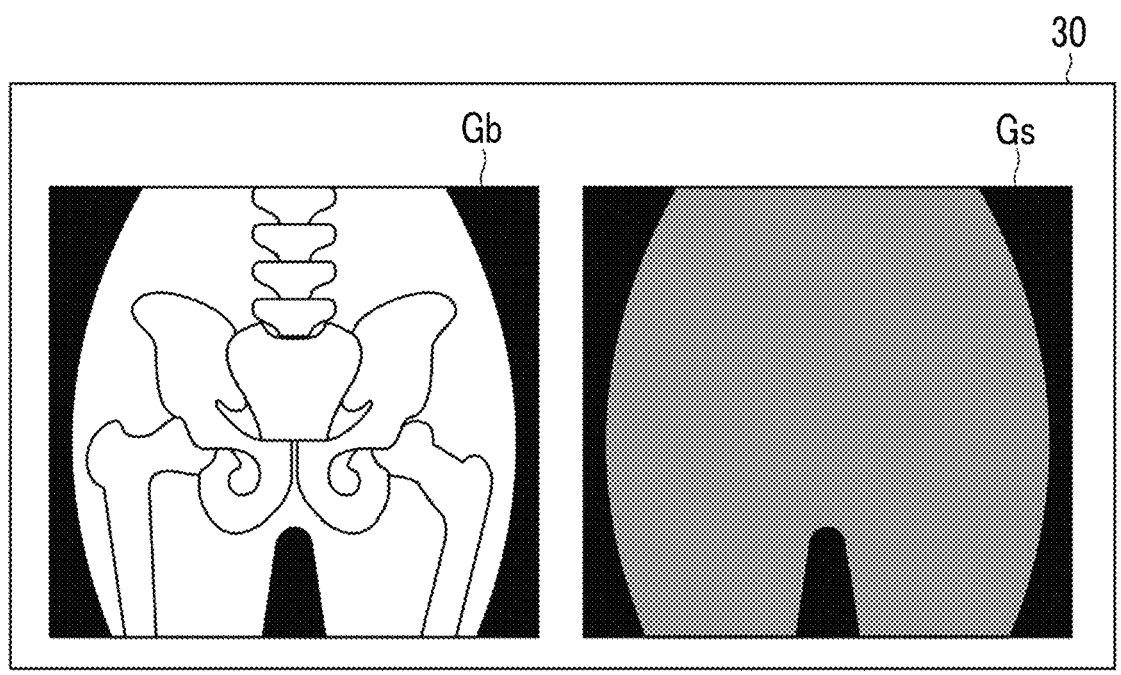
FIG. 6 is a diagram showing a display screen.

The display controller 25 displays the bone part image Gb and the soft part image Gs on the display 14. FIG. 6 is a diagram showing a display screen of the bone part image Gb and the soft part image Gs. As shown in FIG. 6, the bone part image Gb and the soft part image Gs are displayed on a display screen 30.

Figure 7:
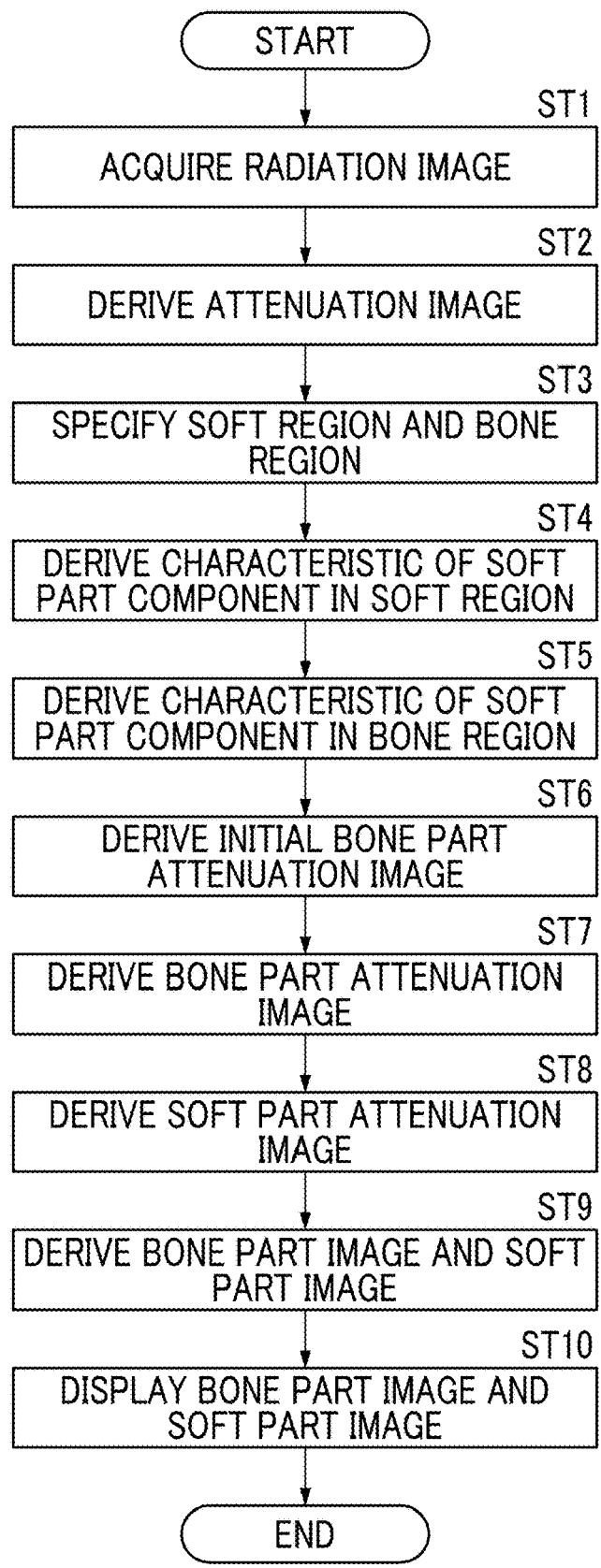
FIG. 7 is a flowchart showing processing performed in the first embodiment.

Hereinafter, processing performed in the first embodiment will be described. FIG. 7 is a flowchart showing the processing performed in the first embodiment. The image acquisition unit 21 causes the imaging apparatus 1 to perform the energy subtraction imaging of the subject H to acquire the first and second radiation images G1 and G2 (radiation image acquisition: step ST1). Next, the region specifying unit 22 derives the first attenuation image CL and the second attenuation image CH from the first radiation image G1 and the second radiation image G2 (attenuation image derivation: step ST2), and specifies the soft region including only the soft part component and the bone region including the bone part in the first attenuation image CL or the second attenuation image CH (step ST3). Next, the characteristic derivation unit 23 derives the characteristic (attenuation ratio) of the soft part component related to the attenuation of the radiation image in the soft region (step ST4). Then, the characteristic derivation unit 23 derives the characteristic of the soft part component in the bone region (step ST5).

Next, the image derivation unit 24 derives the initial bone part attenuation image Cb0 (step ST6), and derives the bone part attenuation image Cb1 by converting the contrast of the initial bone part attenuation image Cb0 (step ST7). Further, the image derivation unit 24 derives the soft part attenuation image Cs1 by subtracting the bone part attenuation image Cb1 from the first attenuation image CL (step ST8). Then, the image derivation unit 24 derives the bone part image Gb and the soft part image Gs by Expression (6) and Expression (7) (step ST9), the display controller 25 displays the bone part image Gb and the soft part image Gs (step ST10), and the processing is terminated.

As described above, in the first embodiment, the attenuation ratio in the bone region including the bone part component in the first radiation image G1 or the second radiation image G2 is derived based on the attenuation ratio of the soft part component derived in the soft region around the bone region. Then, the soft part image Gs in which the soft part component is emphasized and the bone part image Gb in which the bone part component is emphasized are derived based on the attenuation ratio in at least the region of the subject H in the first radiation image G1 or the second radiation image G2. Therefore, the attenuation ratio of the soft part component in the bone region can be derived accurately, and as a result, the soft part image Gs and the bone part image Gb in which the soft part component and the bone part component are separated accurately can be derived.

In addition, in the first embodiment, the first attenuation image CL and the second attenuation image CH representing the attenuation amounts of the radiation are derived from the first radiation image G1 and the second radiation image G2, and the soft part image Gs and the bone part image Gb are derived by using the first attenuation image CL and the second attenuation image CH. Therefore, in a case in which the derived attenuation amount is used as the soft part removal coefficient K1 for removing the soft part component, the soft part component can be removed satisfactorily by Expression (4). Therefore, it is possible to derive the soft part image Gs and the bone part image Gb in which the soft part component and the bone part component are separated accurately.

Hereinafter, a second embodiment of the present disclosure will be described. Note that a functional configuration of the radiation image processing device according to the second embodiment is the same as the functional configuration of the radiation image processing device according to the first embodiment shown in FIG. 3, and the detailed description for the functional configuration will be omitted. In the second embodiment, the processing performed by the region specifying unit 22 is different from the processing in the first embodiment.

Figure 8:
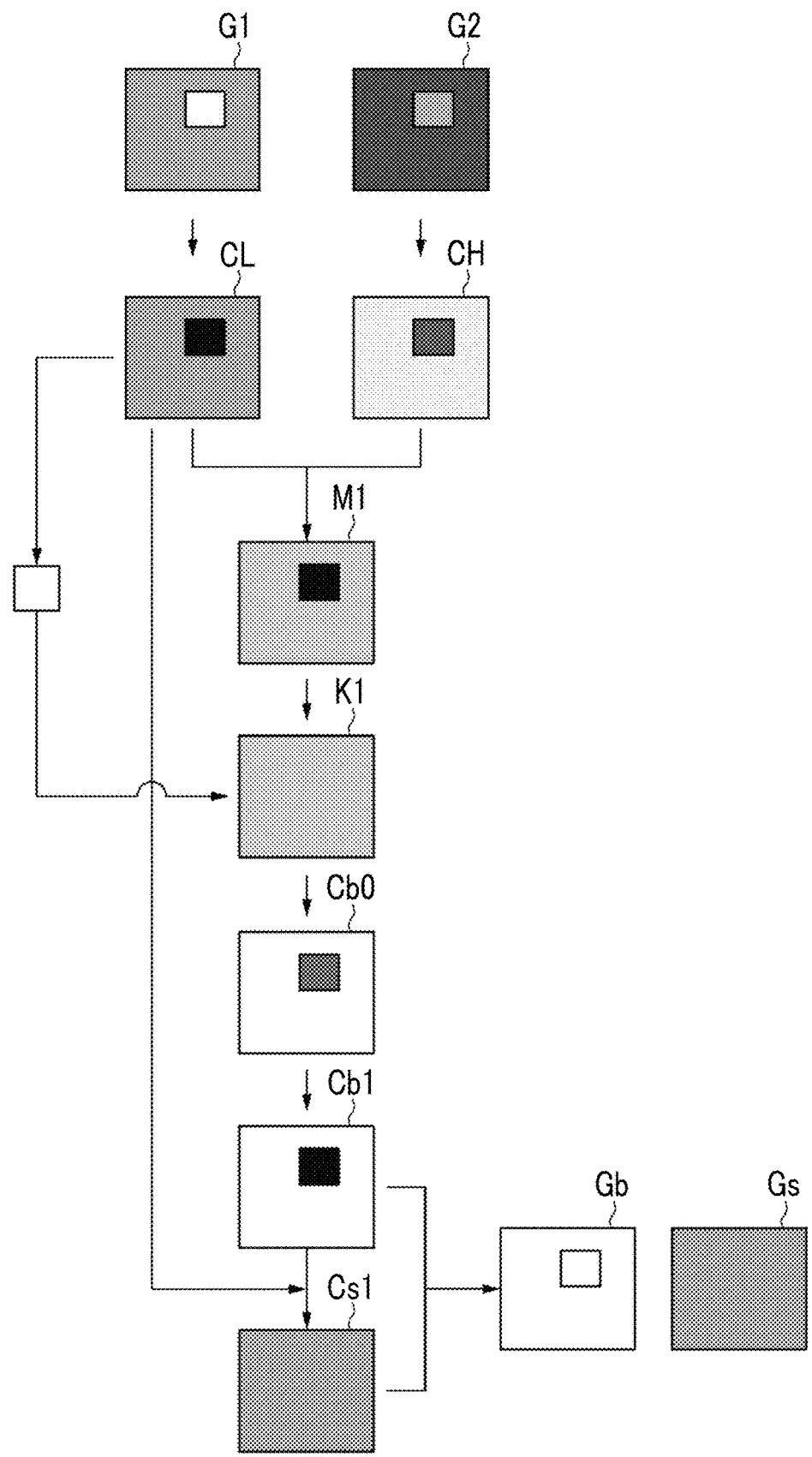
FIG. 8 is a diagram schematically showing processing performed in a radiation image processing device according to a second embodiment.

FIG. 8 is a diagram schematically showing the processing performed in the second embodiment. As shown in FIG. 8, the region specifying unit 22 detects the bone region from the first attenuation image CL or the second attenuation image CH. Note that the bone region may be detected from the first radiation image G1 or the second radiation image G2. For this reason, in the second embodiment, the region specifying unit 22 uses a trained model constructed by subjecting a neural network to machine learning so as to detect the bone region from the radiation image or the attenuation image. In this case, the trained model is constructed to detect the bone region by learning the bone region based on the pixel value of the radiation image or the attenuation image.

On the other hand, in the radiation image or the attenuation image, the pixel value of the bone region and the pixel value of the soft region including only the soft part component are significantly different from each other. Therefore, the bone region may be detected from the radiation image or the attenuation image by performing threshold value processing on the radiation image or the attenuation image. In addition, in the radiation image or the attenuation image, a shape of the bone region is specified by a difference between the pixel value of the bone region and the pixel value of the soft region including only the soft part component. Therefore, the bone region may be detected from the radiation image or the attenuation image by template matching using the shape of the bone region according to a part of the subject H included in the radiation image or the attenuation image.

Then, in the second embodiment, the characteristic derivation unit 23 derives the attenuation ratio of the soft part component in the bone region specified by the region specifying unit 22 based on the pixel value of the radiation image or the attenuation image as described above. Since the processing after the derivation of the attenuation ratio of the soft part component in the bone region is the same as the processing in the first embodiment, the detailed description thereof will be omitted here.

Here, in the second embodiment, in a case in which the region specifying unit 22 specifies the bone region and the soft region from the first radiation image G1 or the second radiation image G2, the characteristic derivation unit 23 may derive the first attenuation image CL and the second attenuation image CH. In addition, in this case, the characteristic derivation unit 23 need only derive the attenuation ratio of the soft region, the attenuation ratio of the soft part component for the bone region, and the attenuation ratio map M1.

Note that, in the first and second embodiments, the initial bone part attenuation image Cb0, the bone part attenuation image Cb1, and the soft part attenuation image Cs1 are derived by using the first attenuation image CL, the second attenuation image CH, and the soft part removal coefficient K1, and then the bone part image Gb and the soft part image Gs are derived. However, the present disclosure is not limited to this. The bone part image Gb and the soft part image Gs may be derived by Expression (8) and Expression (9) by using the first radiation image G1, the second radiation image G2, and the soft part removal coefficient K1.

$$Gb(x,y)=G1(x,y)-K1(x,y)\times G2(x,y) \tag{8}$$

$$Gs(x,y)=G1(x,y)-Gb(x,y) \tag{9}$$

Hereinafter, a third embodiment of the present disclosure will be described. Note that a functional configuration of the radiation image processing device according to the third embodiment is the same as the functional configuration of the radiation image processing device according to the first embodiment shown in FIG. 3, and the detailed description for the functional configuration will be omitted. In the first embodiment described above, the attenuation ratio of the soft part component is derived as the characteristic of the first component. However, the third embodiment is different from the first embodiment in that a soft part attenuation coefficient, which is the attenuation coefficient of the low-energy radiation and the high-energy radiation due to the soft part component is derived as the characteristic of the first component.

Figure 9:
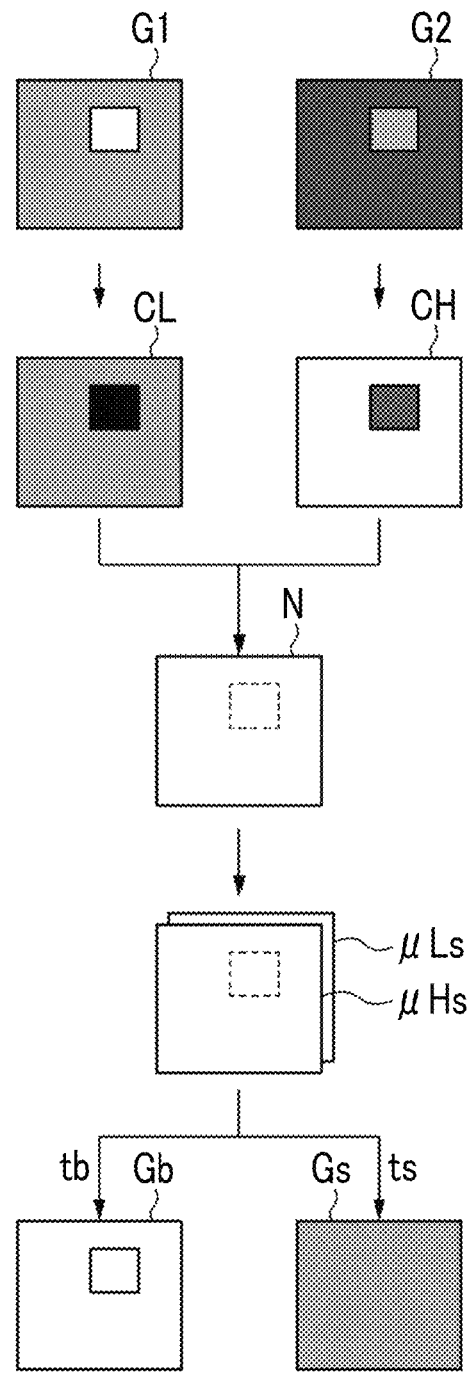
FIG. 9 is a diagram schematically showing processing performed in a radiation image processing device according to a third embodiment.

FIG. 9 is a diagram schematically showing the processing performed in the third embodiment. In the third embodiment, since the processing until the region specifying unit 22 derives the first attenuation image CL and the second attenuation image CH is the same as the processing in the first and second embodiments, the detailed description thereof will be omitted.

In the third embodiment, the region specifying unit 22 derives a ratio of the fat at each pixel position of the first and second radiation images G1 and G2 by using the attenuation coefficients of the fat and the muscle for each of the high-energy radiation and the low-energy radiation. Then, the region specifying unit 22 specifies the bone region and the soft region based on the derived ratio of the fat.

Here, the attenuation amount of the radiation due to the subject H is determined depending on the thicknesses of the soft part and the bone part and a radiation quality (whether high energy or low energy). Therefore, in a case in which the attenuation coefficient representing an attenuation rate per unit thickness is 11, attenuation amounts CL0 and CH0 of the radiation at each pixel position in each of the low-energy image and the high-energy image can be represented by Expression (10) and Expression (11). In Expression (10) and Expression (11), ts is a thickness of the soft part, tb is a thickness of the bone part, μLs is the soft part attenuation coefficient of the low-energy radiation, μLb is a bone part attenuation coefficient of the low-energy radiation, μHS is the soft part attenuation coefficient of the high-energy radiation, and μHB is the bone part attenuation coefficient of the high-energy radiation.

$$CL0=\mu Ls(ts,tb)\times ts+\mu Lb(ts,tb)\times tb \tag{10}$$

$$CH0=\mu Hs(ts,tb)\times ts+\mu Hb(ts,tb)\times tb \tag{11}$$

In Expression (10) and Expression (11), the attenuation amount CL0 of the low-energy image corresponds to the pixel value of the first attenuation image CL, and the attenuation amount CH0 of the high-energy image corresponds to the pixel value of the second attenuation image CH. Therefore, Expression (10) and Expression (11) are represented by Expression (12) and Expression (13). Note that all of Expression (10) to Expression (13) represent a relationship between the first attenuation image CL and the second attenuation image CH in each pixel, but (x,y) representing the pixel position is omitted.

$$CL0=\mu Ls(ts,tb)\times ts+\mu Lb(ts,tb)\times tb \tag{12}$$

$$CH=\mu Hs(ts,tb)\times ts+\mu Hb(ts,tb)\times tb \tag{13}$$

By solving Expression (12) and Expression (13) with the thickness ts of the soft part and the thickness tb of the bone part as variables, the thickness ts of the soft part and the thickness tb of the bone part can be derived. In order to solve Expression (12) and Expression (13), the soft part attenuation coefficients µLs and µHs and the bone part attenuation coefficients µLb and µHb for each of the low-energy radiation and the high-energy radiation are necessary. Here, since there is no difference in the composition of the bone part according to the subject H, the bone part attenuation coefficients µLb and µHb according to the thickness ts of the soft part and the thickness tb of the bone part can be prepared in advance.

On the other hand, the soft part cannot be prepared in advance because the muscle and the fat are mixed in a complicated manner and the ratio of the muscle and the fat differs according to the subject H. Therefore, in the third embodiment, the region specifying unit 22 derives the soft part attenuation coefficient µLs for the low-energy radiation and the soft part attenuation coefficient pHs for the high-energy radiation by using the first attenuation image CL and the second attenuation image CH. Hereinafter, the derivation of the soft part attenuation coefficients µLs and µHs will be described.

Figure 10:
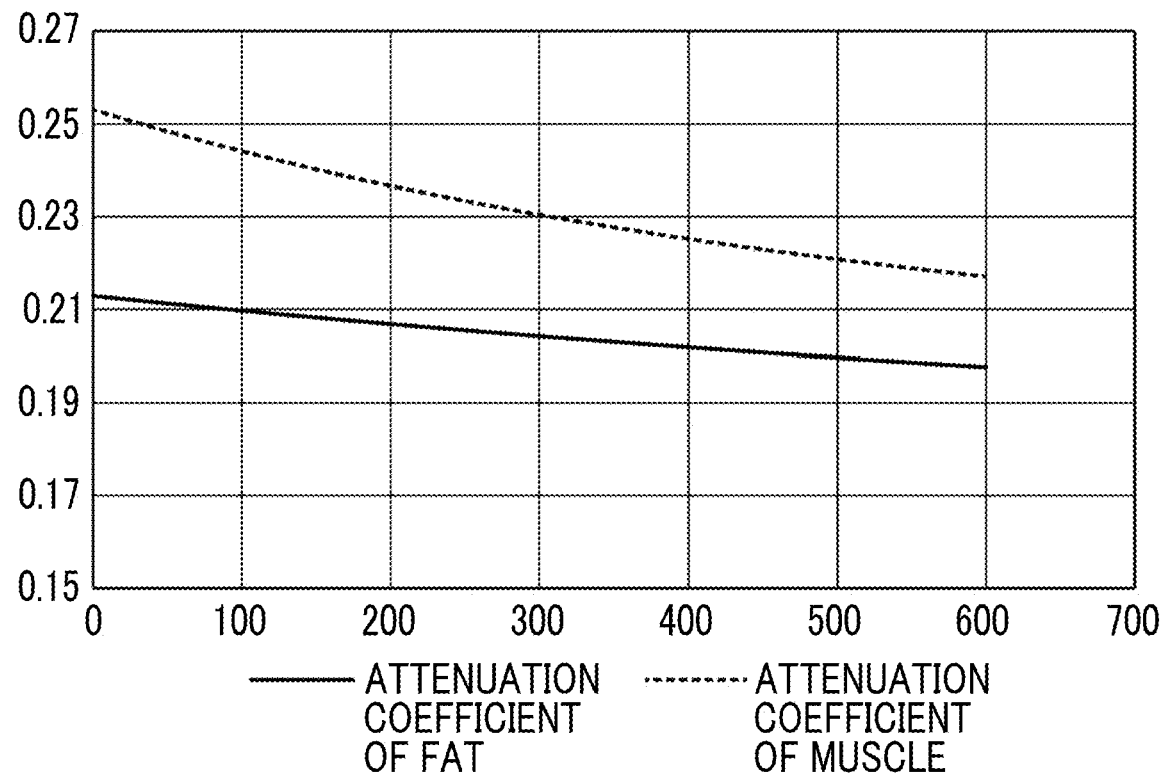
FIG. 10 is a diagram showing attenuation coefficients of fat and muscle.

In the third embodiment, the soft part attenuation coefficient is derived on the assumption that, among the compositions constituting the soft part, the composition having the highest density is the muscle, the composition having a lower density is the fat, and a mixed composition in which the fat and the muscle are mixed has an intermediate value of both attenuation coefficients. First, the region specifying unit 22 calculates provisional soft part attenuation coefficients µ0Ls and µ0Hs for each of the low-energy radiation and the high-energy radiation by setting the ratio of the fat at each pixel position to N % and performing weighting addition of the attenuation coefficient of the fat and the attenuation coefficient of the muscle at a ratio of N:100—N while sequentially increasing N from 0. Note that, in a case in which the fat and the muscle overlap each other, the attenuation coefficient is changed due to the influence of the radiation quality hardening of the component (usually the fat) present on the radiation source 3 side. However, in the present embodiment, the influence of the radiation quality hardening is not taken into consideration. Therefore, N %, which is the ratio of the fat used in the present embodiment, does not match the actual body fat percentage of the subject H. The processing is based on the assumption that the actual soft part attenuation coefficient is a value between the attenuation coefficient of the fat and the attenuation coefficient of the muscle shown in FIG. 10.

Next, the region specifying unit 22 calculates a body thickness TN in a case in which the ratio of the fat is N % by Expression (14) from the pixel value of the first attenuation image CL and the provisional soft part attenuation coefficient µ0Ls for the low-energy image. In this case, the body thickness TN is calculated on the assumption that the pixel including the bone part is also composed of only the soft part.

$$TN(x,y)=CL(x,y)/\mu 0Ls(x,y) \quad (14)$$

Next, the region specifying unit 22 calculates an attenuation amount CHN1 of the high-energy radiation according to Expression (15) from the body thickness TN calculated by Expression (14) and the provisional soft part attenuation coefficient µ0Hs for the high-energy radiation. Then, the second attenuation image CH is subtracted from the attenuation amount CHN1 by Expression (16) to calculate a difference value ΔCH.

$$CHN1(x,y)=TN(x,y)\times\mu 0Hs(x,y) \quad (15)$$

$$\Delta CH(x,y)=CHN1(x,y)-CH(x,y) \quad (16)$$

A case in which the difference value ΔCH is a negative value means that the provisional soft part attenuation coefficients µ0Ls and µ0Hs are smaller than a correct answer soft part attenuation coefficient, that is, closer to the fat. A case in which the difference value ΔCH is a positive value means that the provisional soft part attenuation coefficients µ0Ls and µ0Hs are closer to the muscle. The region specifying unit 22 calculates the provisional soft part attenuation coefficients µ0Ls and µ0Hs for all the pixels of the first attenuation image CL and the second attenuation image CH while changing N such that the difference value ΔCH approaches 0. Then, N in a case in which the difference value ΔCH is 0 or equal to or smaller than a predetermined threshold value is determined as the ratio of the fat for the pixel. In addition, the region specifying unit 22 determines the provisional soft part attenuation coefficients µ0Ls and µ0Hs in the calculation of the determined ratio N of the fat as the soft part attenuation coefficients µLs and µHs. Note that, the ratio N of the fat need only be increased in a case in which the difference value ΔCH is a negative value, and the ratio N of the fat need only be decreased in a case in which the difference value ΔCH is a positive value.

Here, at the pixel of the region including the bone part component in the first radiation image G1 and the second radiation image G2, the ratio of the fat is a value close to 0 or a negative value. In a case in which the subject H is a human being, the ratio of the fat cannot be 0 or a negative value. Therefore, the region specifying unit 22 specifies the region consisting of the pixel at which the ratio N of the fat in the first radiation image G1 and the second radiation image G2 is a value close to 0 (for example, a value smaller than the predetermined threshold value) or a negative value, as the bone region in the first radiation image G1 and the second radiation image G2. In addition, the region specifying unit 22 specifies the region other than the bone region in the first radiation image G1 and the second radiation image G2 as the soft region.

In the third embodiment, the characteristic derivation unit 23 derives the soft part attenuation coefficients µLs and µHs as the characteristics of the first component. Here, in the third embodiment, the region specifying unit 22 derives the soft part attenuation coefficients µLs and µHs for each pixel of the first radiation image G1 or the second radiation image G2. Therefore, the characteristic derivation unit 23 uses the soft part attenuation coefficients µLs and µHs derived by the region specifying unit 22 as the characteristics of the first component in the soft region. That is, in the third embodiment, the region specifying unit 22 also has the function as the characteristic derivation unit 23.

On the other hand, the characteristic derivation unit 23 derives the soft part attenuation coefficients µLs and µHs in the bone region by interpolating the soft part attenuation coefficient of the soft region around the bone region. Note that, instead of the interpolation, a median value of the soft part attenuation coefficients µLs and µHs in the soft region, an average value thereof, or a value thereof that is a predetermined ratio from the small attenuation coefficient side may be derived as the soft part attenuation coefficients µLs and µHs for the bone region. As a result, the characteristic derivation unit 23 derives the characteristic of the first component for at least the region of the subject H of the first radiation image G1 or the second radiation image G2.

In the third embodiment, the image derivation unit 24 derives the soft part image Gs in which the soft part component is emphasized and the bone part image Gb in which the bone part component is emphasized. In the third embodiment, the thickness ts of the soft part and the thickness tb of the bone part are derived based on the soft part attenuation coefficients μLs and μHs derived by the characteristic derivation unit 23 and the bone part attenuation coefficients μLb and μHb derived in advance, and the soft part image Gs and the bone part image Gb are derived based on the thickness ts of the soft part and the thickness tb of the bone part, which are derived.

Expression (12) and Expression (13) are used to derive the thickness ts of the soft part and the thickness tb of the bone part. As described above, the image derivation unit 24 derives the thickness ts of the soft part and the thickness tb of the bone part by solving Expression (12) and Expression (13) with the thickness ts of the soft part and the thickness tb of the bone part as variables. Note that the thickness ts of the soft part and the thickness tb of the bone part, which are derived, are derived for each pixel of the first attenuation image CL and the second attenuation image CH. However, in the following description, (x,y) representing the pixel position will be omitted.

First, the image derivation unit 24 calculates a thickness ts0 of the soft part in a case in which the thickness tb of the bone part=0 is by Expression (13). In a case of tb=0 and ts=ts0, $CH=\mu Hs(ts,0) \times ts0 + \mu Hb(ts0,0) \times 0 = \mu Hs(ts0,0) \times ts0$, and thus ts0 is calculated by Expression (17). In addition, the image derivation unit 24 calculates a thickness tb0 of the bone part in a case in which the thickness ts of the soft part is 0 by Expression (13). In a case of ts=0 and tb=tb0, $CH=\mu Hs(0,tb0) \times 0 + \mu Hb(0,tb0) \times tb0$, and thus tsb is calculated by Expression (18). Note that, in Expression (17) and Expression (18), (x,y) representing the pixel position is omitted.

$$ts0 = CH/\mu HS(ts0,0) \quad (17)$$

$$tb0 = CH/\mu Hb(tb0,0) \quad (18)$$

Figure 11:
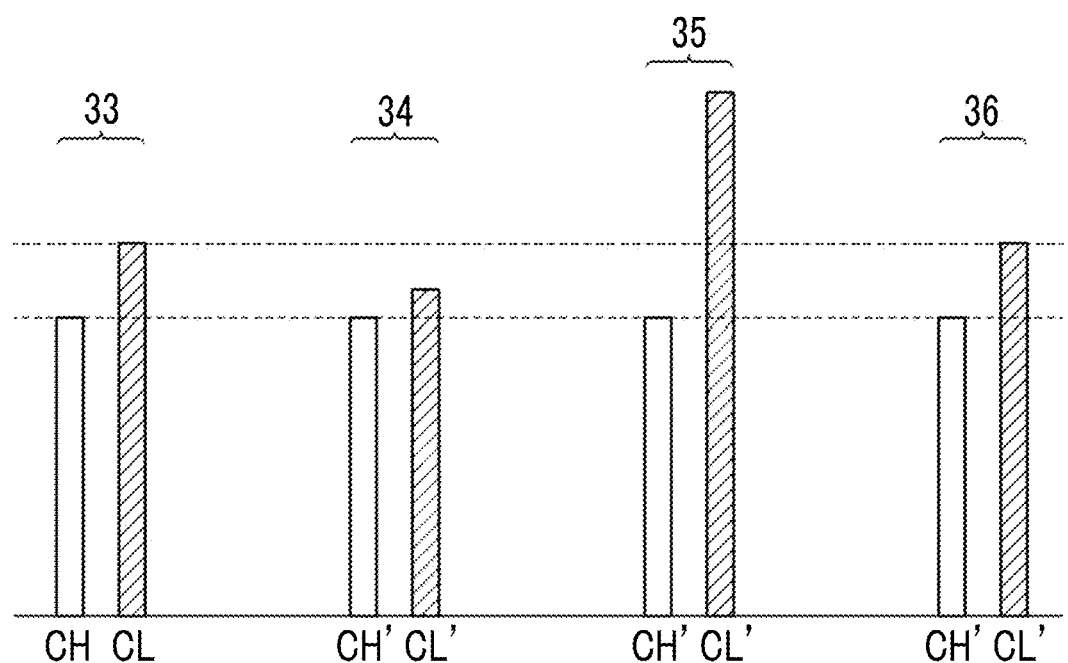
FIG. 11 is a diagram showing an attenuation amount according to a thickness of a bone part and a thickness of a soft part in a high-energy image and a low-energy image.

FIG. 11 is a diagram showing a relationship between the attenuation amounts according to the thickness of the bone part and the thickness of the soft part. In FIG. 11, an attenuation amount 33 indicates the attenuation amount which is the pixel value of the low-energy image and the attenuation amount which is the pixel value of the high-energy image which are derived by actually imaging the subject. For the sake of explanation, in the attenuation amount 33, the attenuation amount which is the pixel value of the low-energy image and the attenuation amount which is the pixel value of the high-energy image have the same references CL and CH, respectively, as those of the first attenuation image and the second attenuation image. Here, the attenuation amount of the low-energy image and the attenuation amount of the high-energy image are larger as the density of the composition is higher. Therefore, the composition in a case of tb=0 and ts=ts0 has a lower density than the composition based on the actual thickness of the bone part and the actual thickness of the soft part. Therefore, in a case in which tb=0 and ts=ts0, the pixel value, that is, the attenuation amount of the first attenuation image (here, a provisional first attenuation image CL') derived by Expression (12) is smaller than the pixel value of the first attenuation image CL derived from the actual thickness of the bone part and the actual thickness of the soft part (that is, CL>CL') as shown in an attenuation amount 34 of FIG. 11.

On the other hand, the composition in a case in which tb=tb0 and ts=0 has a higher density than the composition based on the actual thickness of the bone part and the actual thickness of the soft part. Therefore, in a case in which tb=tb0 and ts=0, the pixel value, that is, the attenuation amount of the provisional first attenuation image CL' derived by Expression (12) is smaller than the pixel value of the first attenuation image CL derived from the actual thickness of the bone part and the actual thickness of the soft part (that is, CL<CL') as shown in an attenuation amount 35 of FIG. 11.

Note that the pixel value, that is, the attenuation amount of the provisional first attenuation image CL' derived by Expression (12) by using the actual thickness of the bone part and the actual thickness of the soft part is the same as the pixel value of the first attenuation image CL as shown in an attenuation amount 36 of FIG. 11. By using this fact, the image derivation unit 24 derives the thickness tb of the bone part and the thickness ts of the soft part in the following manner.

Step 1

First, in Expression (13), a provisional thickness tsk of the soft part is calculated by using the pixel value of the second attenuation image CH and the soft part attenuation coefficient μHs derived for each pixel. Note that 0 is used as an initial value of a provisional thickness tbk of the bone part.

Step 2

Next, a provisional first attenuation image CL' is calculated by Expression (12) by using the calculated provisional thickness tsk of the soft part, the provisional thickness tbk of the bone part, and the soft part attenuation coefficient μLs and the bone part attenuation coefficient μLb for the low-energy radiation.

Step 3

Next, the difference value ΔCL between the provisional first attenuation image CL' and the first attenuation image CL is calculated. The provisional thickness tbk of the bone part is updated on the assumption that the difference value ΔCL is the pixel value corresponding to the amount of the radiation attenuated by the bone.

Step 4

Next, a provisional second attenuation image CH' is calculated by Expression (13) by using the updated provisional thickness tbk of the bone part and the provisional thickness tsk of the soft part.

Step 5

Next, the difference value ΔCH between the provisional second attenuation image CH' and the second attenuation image CH is calculated. The provisional thickness tsk of the soft part is updated on the assumption that the difference value ΔCH is the pixel value corresponding to the amount of the radiation attenuated by the soft part.

Then, the thickness ts of the soft part and the thickness tb of the bone part are derived by repeating the processing of steps 1 to 5 until the absolute values of the difference values ΔCL and ΔCH are smaller than a predetermined threshold value. Note that the thickness ts of the soft part and the thickness tb of the bone part may be derived by repeating the processing of steps 1 to 5 a predetermined number of times.

Then, the image derivation unit 24 derives the soft part image Gs based on the derived thickness ts of the soft part, and derives the bone part image Gb based on the derived thickness tb of the bone part. Here, the soft part image Gs has the pixel value of the size corresponding to the thickness ts of the soft part, and the bone part image Gb has the pixel value of the size corresponding to the thickness Gb of the bone part.

Figure 12:
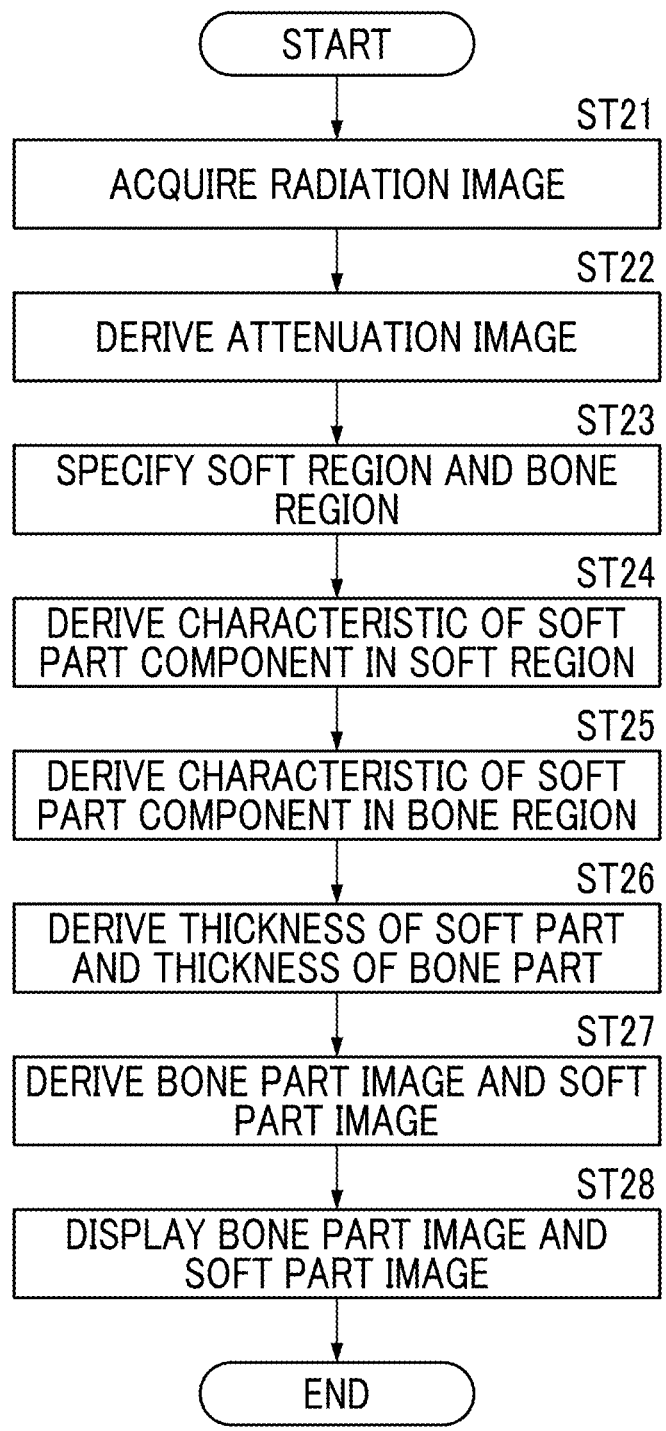
FIG. 12 is a flowchart showing processing performed in the third embodiment.

Hereinafter, the processing performed in the third embodiment will be described. FIG. 12 is a flowchart showing the processing performed in the third embodiment. The image acquisition unit 21 causes the imaging apparatus 1 to perform the energy subtraction imaging of the subject H to acquire the first and second radiation images G1 and G2 (radiation image acquisition: step ST21). Next, the region specifying unit 22 derives the first attenuation image CL and the second attenuation image CH from the first radiation image G1 and the second radiation image G2 (attenuation image derivation: step ST22), and specifies the soft region including only the soft part component and the bone region including the bone part in the first attenuation image CL or the second attenuation image CH (step ST23). Next, the characteristic derivation unit 23 derives the characteristic (soft part attenuation coefficient) of the soft part component related to the attenuation of the radiation image in the soft region (step ST24). Then, the characteristic derivation unit 23 derives the characteristic of the soft part component in the bone region (step ST25).

Next, the image derivation unit 24 derives the thickness ts of the soft part and the thickness tb of the bone part (step ST26), and derives the bone part image Gb and the soft part image Gs from the thickness ts of the soft part and the thickness tb of the bone part (step ST27). Moreover, the display controller 25 displays the bone part image Gb and the soft part image Gs (step ST28), and the processing is terminated.

As described above, in the third embodiment, the soft part attenuation coefficient is derived based on the characteristic of the soft part component derived in the soft region around the bone region, that is the soft part attenuation coefficient in the bone region including the bone part component in the first radiation image G1 or the second radiation image G2. Then, the soft part image Gs in which the soft part component is emphasized and the bone part image Gb in which the bone part component is emphasized are derived based on the soft part attenuation coefficient in at least the region of the subject H in the first radiation image G1 or the second radiation image G2. Therefore, the soft part attenuation coefficient in the bone region can be derived accurately, and as a result, the soft part image Gs and the bone part image Gb in which the soft part component and the bone part component are separated accurately can be derived.

Figure 13:
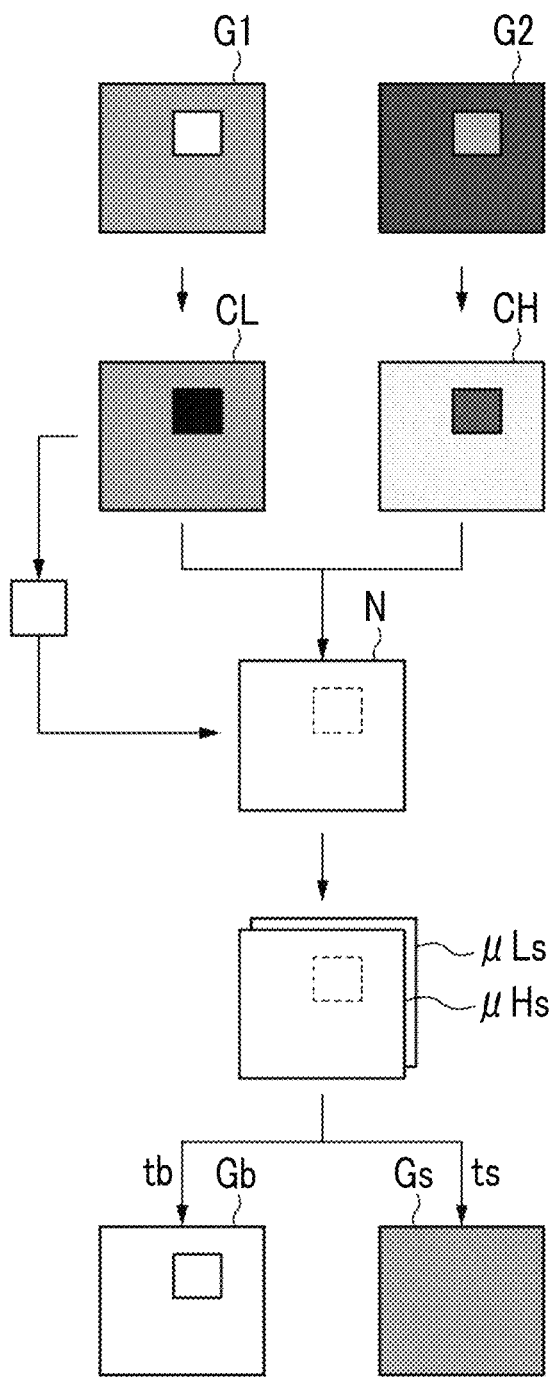
FIG. 13 is a diagram schematically showing processing performed in a radiation image processing device according to a fourth embodiment.

Hereinafter, a fourth embodiment of the present disclosure will be described. Note that a functional configuration of the radiation image processing device according to the fourth embodiment is the same as the functional configuration of the radiation image processing device according to the first embodiment shown in FIG. 3, and the detailed description for the functional configuration will be omitted. In the fourth embodiment, the processing performed by the region specifying unit 22 is different from the processing in the third embodiment. FIG. 13 is a diagram schematically showing the processing performed in the fourth embodiment. As shown in FIG. 13, the region specifying unit 22 detects the bone region from the first attenuation image CL or the second attenuation image CH. Note that the bone region may be detected from the first radiation image G1 or the second radiation image G2. For this reason, in the fourth embodiment, the region specifying unit 22 uses a trained model constructed by subjecting a neural network to machine learning so as to detect the bone region from the radiation image or the attenuation image, as in the second embodiment. In this case, the trained model is constructed to detect the bone region by learning the bone region based on the pixel value of the radiation image or the attenuation image.

On the other hand, in the radiation image or the attenuation image, the pixel value of the bone region and the pixel value of the soft region including only the soft part component are significantly different from each other. Therefore, the bone region may be detected from the radiation image or the attenuation image by performing the threshold value processing on the radiation image or the attenuation image. In addition, in the radiation image or the attenuation image, the shape of the bone region is specified by the difference between the pixel value of the bone region and the pixel value of the soft region including only the soft part component. Therefore, the bone region may be detected from the radiation image or the attenuation image by the template matching using the shape of the bone region according to a part of the subject H included in the radiation image or the attenuation image.

Then, in the fourth embodiment, the characteristic derivation unit 23 derives the soft part attenuation coefficient in the bone region specified by the region specifying unit 22 based on the pixel value of the radiation image or the attenuation image as described above. Since the processing after the derivation of the soft part attenuation coefficient in the bone region is the same as the processing of the third embodiment, the detailed description thereof will be omitted here.

Here, in the fourth embodiment, in a case in which the region specifying unit 22 specifies the bone region and the soft region from the first radiation image G1 or the second radiation image G2, the characteristic derivation unit 23 may derive the first attenuation image CL and the second attenuation image CH. In addition, in this case, the characteristic derivation unit 23 may derive the ratio of the fat and the soft part attenuation coefficient.

Note that, in the third and fourth embodiments, the soft part attenuation coefficient is derived by using the first attenuation image CL and the second attenuation image CH to derive the bone part image Gb and the soft part image Gs, but the present disclosure is not limited to this. The soft part attenuation coefficient may be derived from the first radiation image G1 and the second radiation image G2, and the thickness of the bone part and the thickness of the soft part may be derived to derive the bone part image Gb and the soft part image Gs.

Also, in the each of the embodiments described above, the first and second radiation images G1 and G2 are acquired by the one-shot method, but the present disclosure is not limited to this. The first and second radiation images G1 and G2 may be acquired by a so-called two-shot method in which the imaging is performed twice by using only one radiation detector. In a case of the two-shot method, a position of the subject H included in the first radiation image G1 and the second radiation image G2 may shift due to a body movement of the subject H. Therefore, in the first radiation image G1 and the second radiation image G2, it is preferable to perform the processing according to the present embodiment after registration of the subject is performed.

In addition, in the embodiments described above, the radiation image acquired in the system that images the subject H using the first and second radiation detectors 5 and 6 is used, but it is needless to say that the technology of the present disclosure can be applied even in a case in which the first and second radiation images G1 and G2 are acquired using an accumulative phosphor sheet instead of the radiation detector. In this case, the first and second radiation images G1 and G2 need only be acquired by stacking two accumulative phosphor sheets, emitting the radiation transmitted through the subject H, accumulating and recording radiation image information of the subject H in each of the accumulative phosphor sheets, and photoelectrically reading the radiation image information from each of the accumulative phosphor sheets. Note that the two-shot method may also be used in a case in which the first and second radiation images G1 and G2 are acquired by using the accumulative phosphor sheet.

In addition, the radiation in the embodiments described above is not particularly limited, and α-rays or γ-rays can be used in addition to X-rays.

In addition, in the embodiments described above, various processors shown below can be used as the hardware structure of processing units that execute various types of processing, such as the image acquisition unit 21, the region specifying unit 22, the characteristic derivation unit 23, the image derivation unit 24, and the display controller 25. As described above, the various processors include, in addition to the CPU that is a general-purpose processor which executes software (program) and functions as various processing units, a programmable logic device (PLD) that is a processor whose circuit configuration can be changed after manufacture, such as a field programmable gate array (FPGA), and a dedicated electrical circuit that is a processor having a circuit configuration which is designed for exclusive use in order to execute specific processing, such as an application specific integrated circuit (ASIC).

One processing unit may be configured by one of these various processors, or may be configured by a combination of two or more processors of the same type or different types (for example, a combination of a plurality of FPGAs or a combination of the CPU and the FPGA). In addition, a plurality of the processing units may be configured by one processor.

As an example of configuring the plurality of processing units by one processor, first, as represented by a computer of a client, a server, and the like there is an aspect in which one processor is configured by a combination of one or more CPUs and software and this processor functions as a plurality of processing units. Second, as represented by a system on chip (SoC) or the like, there is an aspect of using a processor that realizes the function of the entire system including the plurality of processing units by one integrated circuit (IC) chip. In this way, as the hardware structure, the various processing units are configured by using one or more of the various processors described above.

Further, as the hardware structures of these various processors, more specifically, it is possible to use an electrical circuit (circuitry) in which circuit elements, such as semiconductor elements, are combined.

The supplementary notes of the present disclosure will be described below.

Supplementary Note 1

A radiation image processing device comprising at least one processor, in which the processor acquires a first radiation image and a second radiation image which are acquired by imaging a subject, which includes a first component consisting of a plurality of compositions and a second component consisting of a single composition, with radiation having different energy distributions, derives a characteristic of the first component related to attenuation of the radiation based on the first radiation image and the second radiation image in a first component region including only the first component in the first radiation image or the second radiation image, derives the characteristic of the first component in a second component region including the second component in the first radiation image or the second radiation image based on the characteristic of the first component derived in the first component region around the second component region, and derives a first component image in which the first component is emphasized and a second component image in which the second component is emphasized, based on the characteristic of the first component in at least a region of the subject in the first radiation image or the second radiation image.

Supplementary Note 2

The radiation image processing device according to Supplementary Note 1, in which the processor specifies the second component region in the first radiation image or the second radiation image based on a pixel value of the first radiation image or the second radiation image, and specifies a region other than the second component region in the first radiation image or the second radiation image as the first component region.

Supplementary Note 3

The radiation image processing device according to Supplementary Note 1, in which the processor derives an attenuation characteristic related to the attenuation of the radiation in at least the region of the subject in the first radiation image or the second radiation image, specifies the first component region and the second component region based on the attenuation characteristic in the region of the subject, and uses the attenuation characteristic derived for the first component region as the characteristic of the first component for the first component region.

Supplementary Note 4

The radiation image processing device according to any one of Supplementary Notes 1 to 3, in which the processor derives a first attenuation image and a second attenuation image, which represent attenuation amounts of the radiation due to the subject, from the first radiation image and the second radiation image, respectively, and derives an attenuation ratio, which is a ratio between corresponding pixels of the first attenuation image and the second attenuation image, as the characteristic of the first component.

Supplementary Note 5

The radiation image processing device according to Supplementary Note 3, in which the processor derives a first attenuation image and a second attenuation image, which represent attenuation amounts of the radiation due to the subject, from the first radiation image and the second radiation image, respectively, and derives an attenuation ratio, which is a ratio between corresponding pixels of the first attenuation image and the second attenuation image, as the attenuation characteristic.

Supplementary Note 6

The radiation image processing device according to Supplementary Note 4 or 5, in which the processor derives an initial second component attenuation image in which the second component is emphasized, based on the first attenuation image, the second attenuation image, and the characteristic of the first component, derives a second component attenuation image by matching a contrast of the second component included in the initial second component attenuation image with a contrast of the second component included in the first attenuation image or the second attenuation image, derives a first component attenuation image in which the first component is emphasized, based on the first attenuation image or the second attenuation image, and the second component attenuation image, and derives the first component image and the second component image from the first component attenuation image and the second component attenuation image, respectively.

Supplementary Note 7

The radiation image processing device according to Supplementary Note 1, in which the processor derives information related to thicknesses of the plurality of compositions in at least the region of the subject in the first radiation image or the second radiation image, and specifies the first component region and the second component region based on the information related to the thicknesses of the plurality of compositions in the region of the subject.

Supplementary Note 8

The radiation image processing device according to Supplementary Note 1, 2, or 7, in which the processor derives an attenuation coefficient of the first component as the characteristic of the first component based on an attenuation coefficient of the radiation of each of the plurality of compositions included in the first component and information related to a thickness of each of the plurality of compositions.

Supplementary Note 9

The radiation image processing device according to Supplementary Note 7 or 8, in which the processor derives a first attenuation image and a second attenuation image, which represent attenuation amounts of the radiation due to the subject, from the first radiation image and the second radiation image, respectively, derives a thickness of the first component and a thickness of the second component based on the first attenuation image, the second attenuation image, the characteristic of the first component, and a characteristic of the second component, and derives the first component image and the second component image based on the thickness of the first component and the thickness of the second component.

Supplementary Note 10

The radiation image processing device according to any one of Supplementary Notes 1 to 9, in which the first component is a soft part of the subject, the second component is a bone part of the subject, and the plurality of compositions included in the first component are fat and muscle.

Supplementary Note 11

A radiation image processing method comprising acquiring a first radiation image and a second radiation image which are acquired by imaging a subject, which includes a first component consisting of a plurality of compositions and a second component consisting of a single composition, with radiation having different energy distributions, deriving a characteristic of the first component related to attenuation of the radiation based on the first radiation image and the second radiation image in a first component region including only the first component in the first radiation image or the second radiation image, deriving the characteristic of the first component in a second component region including the second component in the first radiation image or the second radiation image based on the characteristic of the first component derived in the first component region around the second component region, and deriving a first component image in which the first component is emphasized and a second component image in which the second component is emphasized, based on the characteristic of the first component in at least a region of the subject in the first radiation image or the second radiation image.

Supplementary Note 12

A radiation image processing program causing a computer to execute a procedure of acquiring a first radiation image and a second radiation image which are acquired by imaging a subject, which includes a first component consisting of a plurality of compositions and a second component consisting of a single composition, with radiation having different energy distributions, a procedure of deriving a characteristic of the first component related to attenuation of the radiation based on the first radiation image and the second radiation image in a first component region including only the first component in the first radiation image or the second radiation image, a procedure of deriving the characteristic of the first component in a second component region including the second component in the first radiation image or the second radiation image based on the characteristic of the first component derived in the first component region around the second component region, and a procedure of deriving a first component image in which the first component is emphasized and a second component image in which the second component is emphasized, based on the characteristic of the first component in at least a region of the subject in the first radiation image or the second radiation image.

What is claimed is:

1. A radiation image processing device comprising:
   at least one processor,
   wherein the processor
   acquires a first radiation image and a second radiation image which are acquired by imaging a subject, which includes a first component consisting of a plurality of compositions and a second component consisting of a single composition, with radiation having different energy distributions,
   derives a characteristic of the first component related to attenuation of the radiation based on the first radiation image and the second radiation image in a first component region including only the first component in the first radiation image or the second radiation image,
   derives the characteristic of the first component in a second component region including the second component in the first radiation image or the second radiation image based on the characteristic of the first component derived in the first component region around the second component region, and
   derives a first component image in which the first component is emphasized and a second component image in which the second component is emphasized, based on the characteristic of the first component in at least a region of the subject in the first radiation image or the second radiation image.

2. The radiation image processing device according to claim 1,
   wherein the processor
   specifies the second component region in the first radiation image or the second radiation image based on a pixel value of the first radiation image or the second radiation image, and
   specifies a region other than the second component region in the first radiation image or the second radiation image as the first component region.

3. The radiation image processing device according to claim 1,
   wherein the processor
   derives an attenuation characteristic related to the attenuation of the radiation in at least the region of the subject in the first radiation image or the second radiation image,
   specifies the first component region and the second component region based on the attenuation characteristic in the region of the subject, and uses the attenuation characteristic derived for the first component region as the characteristic of the first component for the first component region.

4. The radiation image processing device according to claim 1,
wherein the processor
derives a first attenuation image and a second attenuation image, which represent attenuation amounts of the radiation due to the subject, from the first radiation image and the second radiation image, respectively, and
derives an attenuation ratio, which is a ratio between corresponding pixels of the first attenuation image and the second attenuation image, as the characteristic of the first component.

5. The radiation image processing device according to claim 2,
wherein the processor
derives a first attenuation image and a second attenuation image, which represent attenuation amounts of the radiation due to the subject, from the first radiation image and the second radiation image, respectively, and
derives an attenuation ratio, which is a ratio between corresponding pixels of the first attenuation image and the second attenuation image, as the characteristic of the first component.

6. The radiation image processing device according to claim 3,
wherein the processor
derives a first attenuation image and a second attenuation image, which represent attenuation amounts of the radiation due to the subject, from the first radiation image and the second radiation image, respectively, and
derives an attenuation ratio, which is a ratio between corresponding pixels of the first attenuation image and the second attenuation image, as the characteristic of the first component.

7. The radiation image processing device according to claim 3,
wherein the processor
derives a first attenuation image and a second attenuation image, which represent attenuation amounts of the radiation due to the subject, from the first radiation image and the second radiation image, respectively, and
derives an attenuation ratio, which is a ratio between corresponding pixels of the first attenuation image and the second attenuation image, as the attenuation characteristic.

8. The radiation image processing device according to claim 4,
wherein the processor
derives an initial second component attenuation image in which the second component is emphasized, based on the first attenuation image, the second attenuation image, and the characteristic of the first component,
derives a second component attenuation image by matching a contrast of the second component included in the initial second component attenuation image with a contrast of the second component included in the first attenuation image or the second attenuation image,
derives a first component attenuation image in which the first component is emphasized, based on the first attenuation image or the second attenuation image, and the second component attenuation image, and
derives the first component image and the second component image from the first component attenuation image and the second component attenuation image, respectively.

9. The radiation image processing device according to claim 1,
wherein the processor
derives information related to thicknesses of the plurality of compositions in at least the region of the subject in the first radiation image or the second radiation image, and
specifies the first component region and the second component region based on the information related to the thicknesses of the plurality of compositions in the region of the subject.

10. The radiation image processing device according to claim 1,
wherein the processor derives an attenuation coefficient of the first component as the characteristic of the first component based on an attenuation coefficient of the radiation of each of the plurality of compositions included in the first component and information related to a thickness of each of the plurality of compositions.

11. The radiation image processing device according to claim 2,
wherein the processor derives an attenuation coefficient of the first component as the characteristic of the first component based on an attenuation coefficient of the radiation of each of the plurality of compositions included in the first component and information related to a thickness of each of the plurality of compositions.

12. The radiation image processing device according to claim 9,
wherein the processor derives an attenuation coefficient of the first component as the characteristic of the first component based on an attenuation coefficient of the radiation of each of the plurality of compositions included in the first component and information related to a thickness of each of the plurality of compositions.

13. The radiation image processing device according to claim 9,
wherein the processor
derives a first attenuation image and a second attenuation image, which represent attenuation amounts of the radiation due to the subject, from the first radiation image and the second radiation image, respectively,
derives a thickness of the first component and a thickness of the second component based on the first attenuation image, the second attenuation image, the characteristic of the first component, and a characteristic of the second component, and
derives the first component image and the second component image based on the thickness of the first component and the thickness of the second component.

14. The radiation image processing device according to claim 1,
wherein the first component is a soft part of the subject, the second component is a bone part of the subject, and the plurality of compositions included in the first component are fat and muscle.

15. A radiation image processing method comprising:
acquiring a first radiation image and a second radiation image which are acquired by imaging a subject, which includes a first component consisting of a plurality of compositions and a second component consisting of a single composition, with radiation having different energy distributions;
deriving a characteristic of the first component related to attenuation of the radiation based on the first radiation image and the second radiation image in a first component region including only the first component in the first radiation image or the second radiation image;

deriving the characteristic of the first component in a second component region including the second component in the first radiation image or the second radiation image based on the characteristic of the first component derived in the first component region around the second component region; and deriving a first component image in which the first component is emphasized and a second component image in which the second component is emphasized, based on the characteristic of the first component in at least a region of the subject in the first radiation image or the second radiation image.

16. A non-transitory computer-readable recording medium having embodied thereon a radiation image processing program which, when executed, causes a computer to perform:

a procedure of acquiring a first radiation image and a second radiation image which are acquired by imaging a subject, which includes a first component consisting of a plurality of compositions and a second component consisting of a single composition, with radiation having different energy distributions;

a procedure of deriving a characteristic of the first component related to attenuation of the radiation based on the first radiation image and the second radiation image in a first component region including only the first component in the first radiation image or the second radiation image;

a procedure of deriving the characteristic of the first component in a second component region including the second component in the first radiation image or the second radiation image based on the characteristic of the first component derived in the first component region around the second component region; and a procedure of deriving a first component image in which the first component is emphasized and a second component image in which the second component is emphasized, based on the characteristic of the first component in at least a region of the subject in the first radiation image or the second radiation image.

\* \* \* \* \*